United States Patent [19]

File

[11] 4,004,229
[45] Jan. 18, 1977

[54] EAR ATTACHABLE MINIATURIZED RADIO RECEIVER

[75] Inventor: James R. File, El Segundo, Calif.

[73] Assignees: James R. File; Henry Slate; Jack Takiff, all of Los Angeles, Calif. ; part interest to each

[22] Filed: Feb. 25, 1975

[21] Appl. No.: 552,858

[52] U.S. Cl. ............................... 325/361; 343/787; 336/233
[51] Int. Cl.[2] ......................................... H04B 1/08
[58] Field of Search .................. 325/361, 318, 364; 343/787, 788; 179/107 R, 107 E, 156 R, 182 R; 335/296, 297; 336/233, 234

[56] References Cited

UNITED STATES PATENTS

| 2,995,652 | 8/1961 | Towler | 325/318 |
| 3,234,467 | 2/1966 | Haveson | 325/361 |
| 3,644,833 | 2/1972 | McIntosh | 325/361 |

OTHER PUBLICATIONS

R. Soohoo, "Theory and Application of Ferrites" Prentice-Hall, 1960, pp. 3–6.

J. J. Went, et al., "Ferroxdure, A Class of New Permanent Magnet Materials" Philips Tech. Rev., 13, pp. 194–208.

Primary Examiner—Robert L. Griffin
Assistant Examiner—Michael A. Masinick
Attorney, Agent, or Firm—Christie, Parker & Hale

[57] ABSTRACT

A radio receiver and a battery are housed in a button adapted to fit in the ear cavity. The button is attached to the ear by a hook. The radio receiver has an antenna tuned to intercept a single frequency radio signal, means for producing an audio signal from the radio signal intercepted by the antenna, and means for converting the audio signal to sound waves. The antenna comprises a coil wrapped around an insulated core made of compressed barium ferrite particles of controlled size and a capacitor in parallel with the coil. Due to the high effective permeability of the barium ferrite core, a sufficiently narrow band width and signal strength for satisfactory radio reception in the A.M. broadcast band can be obtained with very small core dimensions.

10 Claims, 4 Drawing Figures

EAR ATTACHABLE MINIATURIZED RADIO RECEIVER

BACKGROUND OF THE INVENTION

This invention relates to radio receivers and, more particularly, to a miniaturized radio receiver suitable for direct attachment to the human ear.

Since the development of the transistor, small hand held transistorized radio receivers have become commonplace. To permit listening in private, hand held transistorized radio receivers are often provided with an earphone attachment comprising a speaker button adapted to fit in the ear of the user and a cable that connects the speaker button to the radio receiver.

The use of transistors has enabled a marked reduction in the size and weight of radio receivers. To further reduce size and weight, transistorized radio receivers generally employ a ferrite core antenna. Conventional ferrite cores are made of ferrous ferrite, magnesium ferrite, and zinc ferrite. However, one of the limiting factors on the size and weight of a transistorized radio receiver remains the ferrite core. The effective permeability and the effective height of a ferrite core are directly related to its length to width ratio. Further, the Q and the signal strength of the radio receiver are directly related to the effective permeability and the cross-sectional area of the core. Thus, to obtain a sufficiently small band width and a sufficiently large signal strength for acceptable radio reception, the length, width, and height of the core are decisive.

In the past there have been attempts to construct radio receivers adapted to be worn directly over the human ear. These radio receivers have proved to be bulky and uncomfortable to wear, partially as a result of the relatively large size of the ferrite core antenna or added circuitry to compensate for the low gain antenna system. Attempts have been made to employ the body of the user as the antenna for a radio receiver adapted to be placed inside the ear cavity; this results in radio reception that is dependent upon the proximity and condition of the ground plane.

SUMMARY OF THE INVENTION

According to the invention, the core of a ferrite core antenna in a miniaturized radio receiver is made of compressed barium ferrite particles of controlled size, i.e., between 10 and 50 microns. Such a barium ferrite core has a much higher permeability and the coil-core combination has a greater effective height than previously used ferrite core materials. As a result, sufficiently small band width and a large signal strength for acceptable radio reception in the A.M. broadcast band can be obtained with a ferrite core having a smaller length and cross-sectional area than heretofore possible.

In the preferred embodiment of the invention, the radio receiver, its ferrite core antenna, and its battery are housed in a button adapted to fit in the ear cavity. The button is attached to the ear by a hook. The antenna comprises a coil wrapped around an insulated compressed barium ferrite core and a fixed capacitor connected in parallel with the coil to tune the receiver to intercept a single frequency radio signal. The core itself has a hexahedral shape, a width approximately three times its height, and a length approximately 10 times its height. The intercepted radio signal is applied to a Darlington amplifier that amplifies and detects the radio signal to produce an audio signal. The audio signal is coupled through an audio frequency amplifier to a loud speaker.

In an alternative embodiment of the invention, a plurality of capacitors are selectively connected in parallel with the coil to change the frequency of the intercepted radio signal.

BRIEF DESCRIPTION OF THE DRAWING

The features of specific embodiments of the best mode contemplated of carrying out the invention are illustrated in the drawing, in which.

DETAILED DESCRIPTION OF THE SPECIFIC EMBODIMENTS

Figure 1:
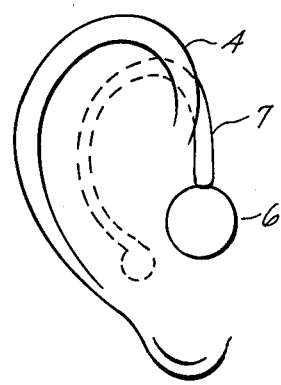
FIG. 1 is a side view of an ear attachable miniaturized radio receiver in its operative position.

In FIG. 1, a human ear 4 has a cavity 5 leading to the ear canal. A button 6, which serves as a housing for a miniaturized radio receiver, fits in cavity 5. Button 6 is attached to the back of ear 4 by a hook 7. Preferably, button 6 and hook 7 are the same size and shape as the conventional earphone attachments for hand-held transistorized radio receivers. However, in contrast thereto, the entire radio receiver shown schematically in FIG. 2, including antenna and battery are housed in button 6.

Figure 2:
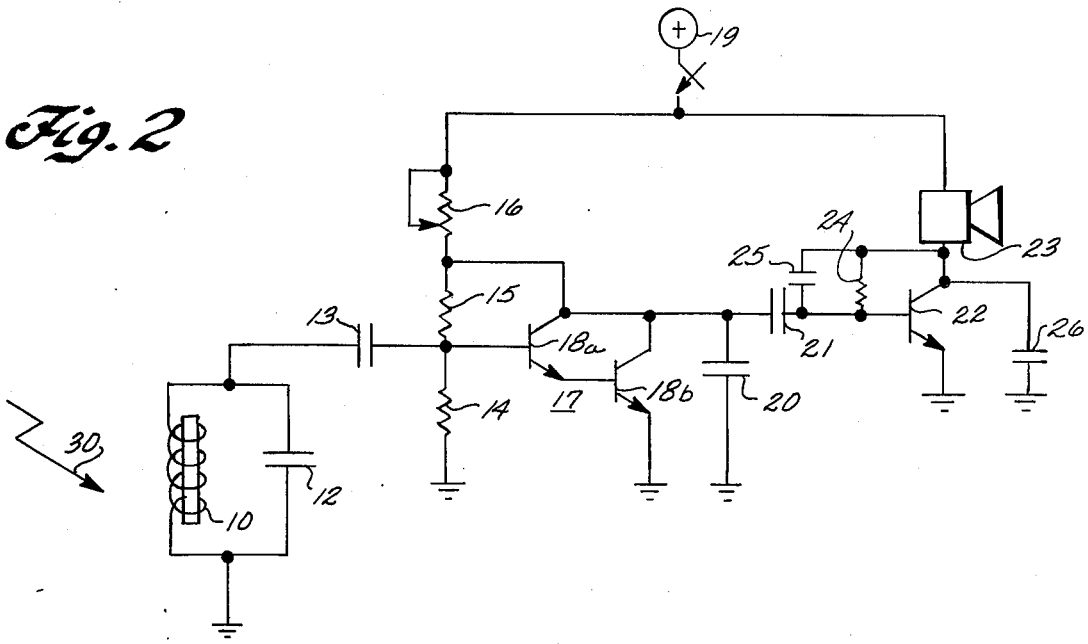
FIG. 2 is a schematic circuit diagram of the radio receiver of FIG. 1.

In FIG. 2, an insulated inductor coil 10 is wrapped around a core 11 made of compressed barium ferrite particles. Core 11 is insulated by wrapping a layer of mylar tape between 0.050 and 0.010 inches thick around it. A capacitor 12 is connected in parallel with coil 10 to provide a ferrite core antenna tuned to a single frequency within the commercial A.M. broadcast band of 535 of 1605 kilohertz. The bandwidth of the antenna between −3 db points or half-power points is about 4 kilohertz and its Q is 401.25 at 1605 kilohertz. One end of the ferrite core antenna is connected to ground.

A Darlington amplifier comprises transistor stages 18a and 18b. The collectors of stages 18a and 18b are connected together. The emitter of stage 18a is connected to the base of stage 18b. The other end of the ferrite core antenna is coupled by a capacitor 13 to the base of stage 18a. The emitter of stage 18b is connected to ground. Resistors 14, 15, and 16 are connected in series between the positive terminal of battery 19 and ground. Resistor 16 could be variable to provide volume control. Battery 19 could comprise one or two 1.4 volt electric watch batteries in series with an ON-OFF switch. The collectors of stages 18a and 18b are connected to the junction of resistors 15 and 16. The base of stage 18a is connected to the junction of resistors 14 and 15. The resistance values of resistors 14, 15, and 16 are selected so Darlington amplifier 17 conducts during excursions of the signal applied to the base of stage 18a in one polarity and cuts off during excursions of the signal applied to the base of stage 18a in the other polarity. In other words, Darlington amplifier 17 functions as a common emitter single-ended, class B transistor amplifier.

A capacitor 20 is connected between the collectors of stages 18a and 18b and ground. A capacitor 21 is connected between the collectors of stages 18a and 18b and the base of a transistor 22. A speaker 23 is connected between battery 19 and the collector of transistor 22. The emitter of transistor 22 is grounded. A resistor 24 and a capacitor 25 are each connected between the base and collector of transistor 22. Capacitor 25 prevents overdrive distortion of the receiver when a strong signal is intercepted by the ferrite core antenna. Resistor 24 serves to bias transistor 22 to function as a linear audio amplifier. A capacitor 26 is connected between the collector of transistor 22 and ground to stabilize the operation of transistor 22.

In operation, the ferrite core antenna intercepts a radio signal 30 oscillating at the frequency to which it is tuned. The intercepted radio signal, which is about L/50 microvolts in magnitude, is amplified and rectified by Darlington amplifier 17. The magnitude of the signal at the output of amplifier 17 is about 50 millivolts. The radio frequency component of the rectified signal is bypassed to ground by capacitor 20 and the audio frequency component of the rectified signal is coupled by capacitor 21 to transistor 22 for further amplification. The amplified audio frequency component having a magnitude of about 500 millivolts is converted to sound waves by speaker 23.

Core 11 is constructed to provide the antenna with a high enough Q, i.e., 300–500 at 1605 kilohertz to intercept a signal with sufficient strength for acceptable radio reception and a low enough resonant frequency to fall within the A.M. broadcast band, i.e., 535 to 1605 kilohertz. This requires a core material exhibiting high permeability and low energy dissipation. The ratio of length of a ferrite core to its cross-sectional area, i.e., width times height, must be great enough to prohibit deleterious demagnetization effects.

Figure 3:
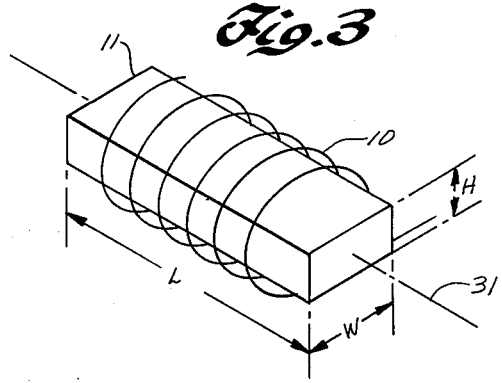
FIG. 3 is an orthogonal view of the core of the antenna of the radio receiver of FIG. 1.

In FIG. 3, core 11 has a hexahedral shape with a length designated L, a width designated W, and a height designated H. Preferably, the width of core 11 is about three times as large as its height, and the length of core 11 is about 10 times as large as its height. The axis of coil 10 designated 31, is aligned with the length of core 11.

Core 11 is formed in the following manner:

1. An aqueous solution of commercially available barium hydroxide is mixed with diluted sulfuric acid to form a precipitate of barium sulfate and water. This reaction is represented as follows:

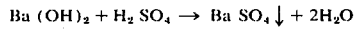

$$Ba(OH)_2 + H_2SO_4 \rightarrow BaSO_4 \downarrow + 2H_2O$$

2. The barium sulfate precipitate is separated by filtering and then dried at a room temperature for about 1 hour to form a powder.

3. The barium sulfate powder is mixed thoroughly with ferric oxide powder ($Fe_2O_3$) and sodium carbonate powder ($Na_2CO_3$) in the proportion of approximately 100 mg of sulfuric oxide to 24 mg of barium sulfate and 11 mg of sodium carbonate.

4. The mixture described in 3 above is placed in a crucible and heated in an oven for approximately 5 hours at a temperature of 850° C. The mixture reacts in the oven to form barium ferrite [BaO 6 ($Fe_2O_3$)], sodium sulfate ($Na_2SO_4$), and carbon dioxide gas.

5. The reacted mixture of barium ferrite and sodium sulfate are removed from the oven, mixed into approximately 1 liter of water without alteration of the particle size (e.g., by grinding), and boiled for 10 minutes to remove soluble impurities.

6. The mixture of barium ferrite and sodium sulfate is separated from the water by filtering and has a muddy consistency.

7. The muddy mixture of barium ferrite and sodium sulfate is poured into a mold at room temperature and pressure in the range of 500 to 1000 psi is applied to the mold to form the core.

8. The molded core is stored at ambient temperature for approximately 8 hours to dry. During this time, the color of the core will change from jet black to a bloody red.

9. The core is placed in an oven for approximately 3 hours at 850° C to burn out the sodium sulfate. Thereafter, the oven is turned off and the core is permitted to remain in the oven for another 4 hours.

10. The core is removed from the oven and immediately coated with an epoxy resin to encapsulate the core and protect it from disintegration.

11. The core is wrapped with mylar tape for insulation.

12. It should be noted that the size of the barium ferrite particles is not mechanically altered at any time in the process, as, for example, by grinding.

The described barium ferrite core exhibits a much higher effective permeability and the resulting antenna system a much larger effective height than previously used ferrite core materials, thereby permitting a reduction in core volume by 25 fold or better. These superior characteristics result from the controlled size of the barium ferrite particles produced by the precipitation, which are principally in the range of 10 to 50 microns.

| Typical component values and dimensions are as follows: | |
| --- | --- |
| Coil 10 | 140 turns of No. 3 wire in 2 layers of 70 turns each, 220 to 250 microhenries |
| Core | L = .3750 in.; W = 1/25 in.; H = .0375 in. |
| Capacitor 12 | 0 to 365 picofarads |
| Capacitor 13 | 0.01 microfarads |
| Capacitor 20 | 0.1 microfarads |
| Capacitor 21 | 0.1 microfarads |
| Capacitor 25 | 1100 picofarads |
| Capacitor 26 | 1000 picofarads |
| Resistor 14 | 1 megohm |
| Resistor 15 | 150 kilohms |
| Resistor 16 | 2.7 kilohms |
| Resistor 24 | 150 kilohms |
| Speaker 23 | 800 ohms (approximate) |
| Amplifier 17 | MPSA12 |
| Transistor 22 | 2N2222A |
| Battery 19 | 2.8 volts |

Figure 4:
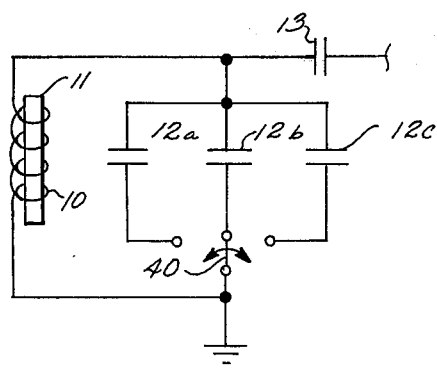
FIG. 4 is an alternative embodiment of a portion of the circuit of FIG. 2.

In FIG. 4, capacitors 12a, 12b, and 12c and a switch 40 are substituted for capacitor 12 in FIG. 2. This permits the radio receiver to be tuned to a different frequency for each position of switch 40.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. Apparatus comprising:
   a small button adapted to fit in the ear cavity;
   a hook for attaching the botton to the ear; and
   an AM radio receiver housed in the button, the radio receiver comprising an antenna tuned to intercept a radio signal in the AM frequency band, the antenna having a coil wrapped around and insulated core made of barium ferrite and a capacitor connected in parallel with the coil, means for producing an audio signal from the radio signal intercepted by the antenna, means for converting the audio signal to sound waves, and a battery to provide power for the radio receiver.

2. The apparatus of claim 1, in which the size of the barium ferrite particles is principally between 10 and 50 microns.

3. The apparatus of claim 1, in which the antenna further comprises an additional capacitor and means for switching the additional capacitor into parallel with the coil to change the frequency to which the antenna is tuned.

4. The apparatus of claim 1, in which the means for producing an audio signal comprises a Darlington transistor amplifier biased by the battery to conduct during excursions of the intercepted radio signal of one polarity and to cut off during excursions of the intercepted radio signal of the other polarity.

5. The apparatus of claim 1, in which the core has a hexahedral shape with a length, a width, and a height, the coil being wrapped around the core in alignment with its length, and the width being approximately three times the height.

6. The apparatus of claim 5, in which the length of the core is approximately 10 times the height.

7. A miniaturized AM radio receiver comprising:

a ferrite core antenna tuned to intercept a radio signal in the AM broadcast band;

means for producing an audio signal from the radio signal intercepted by the antenna; and means for converting the audio signal to sound waves;

wherein the improvement is a core for the antenna made of compressed barium ferrite particles of controlled size.

8. The receiver of claim 7, additionally comprising means for attaching the receiver to the human ear.

9. The receiver of claim 7, in which the antenna comprises an insulated core, a coil wrapped around the core, and a capacitor connected in parallel with the coil.

10. The receiver of claim 7, in which the antenna comprises an insulated core, a coil wrapped around the core, a plurality of capacitors, and means for individually connecting the capacitors in parallel with the coil to change the frequency of the radio signal intercepted by the antenna.

* * * * *